United States Patent [19]

Adkins et al.

[11] Patent Number: 4,944,420

[45] Date of Patent: Jul. 31, 1990

[54] OIL-FILLED TRANSFORMER HOUSING

[75] Inventors: Herbert S. Adkins, Vienna; Darrell D. Harris, Fulton, both of Mo.

[73] Assignee: ABB Power T&D Company, Blue Bell, Pa.

[21] Appl. No.: 294,074

[22] Filed: Jan. 6, 1989

[51] Int. Cl.[5] .............. H02Q 3/08

[52] U.S. Cl. .............. 220/3.3; 220/18

[58] Field of Search .............. 220/3.3, 3.4, 18

[56] References Cited

U.S. PATENT DOCUMENTS

| | | | |
|---|---|---|---|
| 3,659,036 | 4/1972 | Silver | 220/3.3 |
| 3,887,802 | 6/1975 | Goralnik | 220/18 |
| 3,952,908 | 4/1976 | Carson | 220/18 |
| 4,199,072 | 4/1980 | Jacks | 220/3.4 |
| 4,399,922 | 8/1983 | Horsley | 220/3.3 |
| 4,496,067 | 1/1985 | Benscotch | 220/3.3 |

*Primary Examiner*—Joseph Man-Fu Moy

*Attorney, Agent, or Firm*—A. J. Rossi

[57] ABSTRACT

In a transformer housing assembly including a tank and a base supporting the tank, the tank being arranged to contain a body of oil and a transformer the tank and base are secured together, subsequent to individual fabrication thereof, by a plurality of fastening devices. Each fastening device includes an attachment member which is permanently fastened to an upwardly projecting recess formed in the tank bottom, the attachment member being dimensioned to not extend below the portions of the tank bottom surrounding the recess, and the attachment being provided with an internally threaded lined bore. Each fastening device further includes a clamping member extending across the associated recess in the tank bottom and a bolt which passes through an opening in the clamping member and engages in the threaded line bore in order to cause the clamping member to clamp a flange provided at the upper end of the base to the tank bottom.

In order to prevent the insertion of thin bodies between the tank and the base, a T-shaped baffle is provided. The baffle includes a leg which is clamped between the tank bottom and the base flange and a vertical cross piece which bears against front panels of the tank and base.

9 Claims, 2 Drawing Sheets

OIL-FILLED TRANSFORMER HOUSING

BACKGROUND OF THE INVENTION

The present invention relates to oil-filled transformer housings composed of a tank in which a transformer is to installed so as to be immersed in oil and a base for supporting the tank, and particularly to devices for use in attaching the tank to the base.

Oil-filled transformer housings typically include components of the type described above. The tank and base must be manufactured individually, with a protective coating, for example an electrostatic paint coating, applied at least to the tank before the tank and base are assembled together. The tank and base may be secured together by welding or by attachment devices, each device including a component which is permanently secured to the tank bottom.

While it is known to secure the tank and base together by welding, this approach offers a number of disadvantages, including the fact that it prevents the two parts from being painted separately, and thus results in less complete paint coverage, and requires that the tank and base be assembled together during the manufacturing procedure rather than at a later time.

For these reasons, various types of mechanical fastening arrangements have been proposed. One of these arrangements includes carriage bolts inserted horizontally through openings in a lip extending beyond the bottom of the tank and through mating openings provided in the side walls of the base. One disadvantage of this approach is that it requires perfect alignment of the holes in the tank and the base.

Other proposed techniques involve various types of clamping devices all of which require the permanent fastening of projecting parts to the bottom of the tank during tank fabrication, and in particular prior to application of a protective coating to the tank. These devices all present a number of drawbacks.

Thus, since the parts which are permanently attached to the tank project downwardly from the bottom, they create difficulties when the tank is to be carried by a conveyer. In addition, they cause distortion of the bottom of the tank during leak testing and require a substantial amount of welding. It is difficult to effect accurate positioning of the parts to be welded and to subsequently achieve adequate protective coating coverage around and under the welded parts to assure satisfactory corrosion resistance. Moreover, the known parts permanently fastened to the tank bottom are of such a nature that additional means are required for suspending the tanks from their bottoms in order to carry out the coating operation.

Furthermore, standards governing transformer installations, such as those issued by ANSI and NEMA, specify that such installations shall be constructed to prevent insertion of a wire having a specified size between the tank and the base. Various structures of a more or less complicated nature have been proposed for the purpose of satisfying this standard.

SUMMARY OF THE INVENTION

It is an object of the present invention to provide fastening devices which overcome or reduce the drawbacks noted above.

Another object of the invention is to provide fastening devices which do not interfere with fabrication of the tank and whose operation is not impaired by large tolerance variations.

Yet another object of the invention is to provide a simple and effective structure for preventing the insertion of wires or other thin bodies at the joint between the tank and the base of such a transformer installation.

The above and other objects are achieved, according to the present invention, in a transformer housing assembly including a tank and a base supporting the tank, and a plurality of fastening devices securing the tank and base together, the tank being arranged to contain a body of oil and a transformer, and the tank having a bottom whose lower surface delimits a plane, and the base having an open top provided with an inwardly directed peripheral flange which supports the tank, by the improvement wherein the tank bottom is formed to have a plurality of nonperforated upwardly recessed regions, each region having an outer edge located at the bottom plane and an interior portion located at a selected height above the bottom plane, and each said fastening device comprises: an attachment member permanently fastened to the tank bottom at the interior portion of a respective recessed region, the attachment member having a height not greater than the selected height and having a downwardly opening, internally threaded bore; an elongate clamping member extending across the respective recessed region and having two opposed ends one of which bears against the tank bottom and the other of which ends bears against the base flange; and bolting means having an external thread mating with the threaded bore, the bolting means extending through the opening and engaging in the threaded bore for urging the other end of the clamping member against the flange in order to clamp the tank and base together.

The objects according to the invention are further achieved, in a transformer housing assembly including: a tank having a generally horizontal bottom and a generally vertical front wall; and a base supporting the tank and having a generally vertical front wall substantially co-planar with the tank front wall, by the improvement comprising: an elongate baffle member having a T-shaped cross section composed of a cross-piece having two opposed, longitudinally extending side edges, and a leg secured to the cross piece along a line parallel to and between the side edges, the leg extending transversely to the cross piece, wherein the leg is clamped between the tank bottom and the base so that a first portion of the cross piece located to one side of the leg is disposed adjacent the tank front panel, and a second portion of the cross piece located to the other side of the leg is disposed adjacent the base front panel.

DESCRIPTION OF THE PREFERRED EMBODIMENTS

Figure 1:
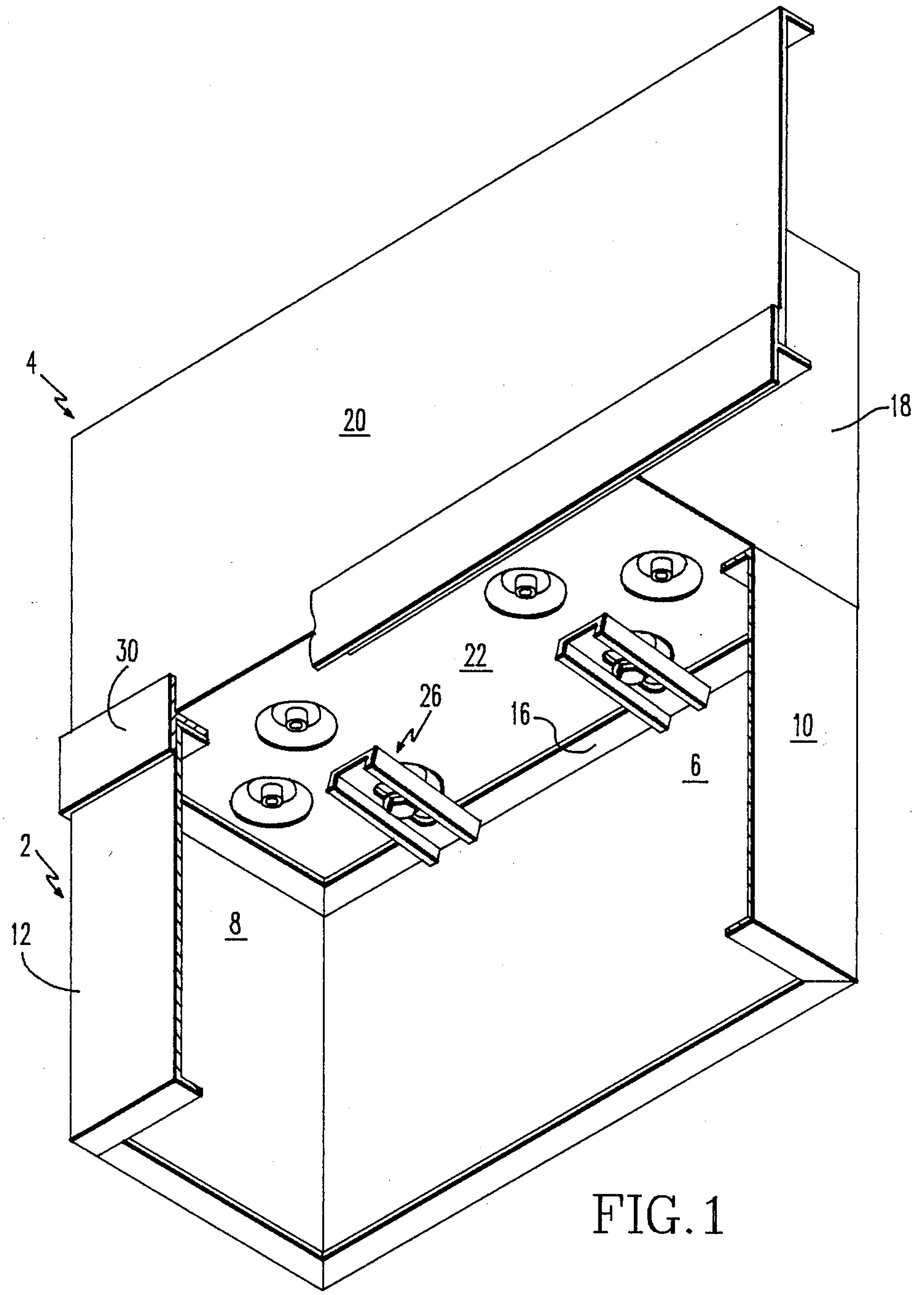
FIG. 1 is a partly cut-away perspective view of a transformer tank and transformer base provided with components according to the invention.

FIG. 1 shows a transformer base-oil tank assembly in its inverted position, base 2 being shown at the top of FIG. 1 and tank 4 being shown at the bottom thereof.

Normally, of course, tank 4 rests on base 2. In such an arrangement, tank 4 is filled with oil and contains one or more transformer units.

Base 2 is composed of two parts, a U-shaped part forming the rear long wall 6 and two short side walls 8 and 10 of base 2, and a straight part 12 forming the front long wall of base 2. Typically, straight part 12 extends from wall 8 to a point beyond wall 10, although a small portion of straight part 12 is illustrated in FIG. 1. Each wall of base 2 is provided with an inwardly directed flange 16 which provides support for oil tank 4.

Tank 4 is basically composed of two parts: a generally U-shaped part 18 forming the long rear wall and short side walls of tank 4 and an L-shaped part which is bent to form the front wall 20 and the bottom 22 of tank 4. As shown, front wall 20 extends beyond one side wall 18 and is thus longer than bottom 22. Straight part 12 of base 2 can be coextensive with front wall 20. Bottom 22 is secured in a fluid-tight manner to the lower edges of the walls defined by U-shaped part 18. This can be accomplished, by way of example, by providing the walls formed by U-shaped part 18 with flanges at the lower edge to which bottom 22 is welded. However, any other procedure known in the art can be employed for fastening bottom 22 to part 18.

Part 12 can be fastened to walls 8 and 10 by welding, and front 20 can be fastened to part 18 in a similar manner.

After base 2 and tank 4 have been individually fabricated and provided with suitable protective coatings, they are assembled together by means of a plurality of clamping assemblies 26. By way of example, six clamping assemblies 26 can be provided. One clamping assembly is shown in FIG. 1, while the locations of the other assemblies are illustrated by recessed portions of base 22. In addition, according to the invention, base 2 and tank 4 are assembled together along with a T-shaped baffle 30 which is interposed between the front walls of base 2 and tank 4.

A completed assembly further includes bushings mounted on front wall 20 and providing external connections to the transformer or transformers housed in tank 4.

Figure 2:
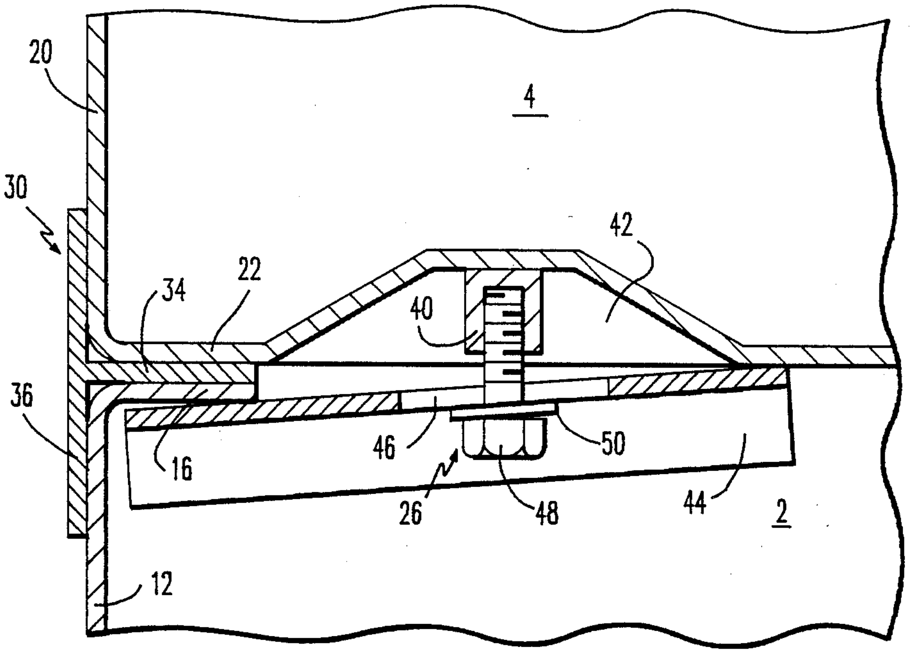
FIG. 2 is a cross-sectional view of a portion of the structure shown in FIG. 1, illustrating the clamping arrangement according to the invention.

FIG. 2 is a detail view illustrating one clamping assembly 26 and the arrangement of baffle 30 between base 2 and tank 4. Baffle 30 is composed of a leg 34 which is held between bottom 22 and flange 16, and a cross piece 36 which rests against front walls 12 and 20 and prevents any penetration of the interface between base 2 and tank 4. Thus, baffle 30 effectively satisfies existing ANSI and NEMA standards prohibiting penetration by wires of various sizes into the connecting region between the base and oil tank of a transformer.

Clamping assembly 26 is composed of a stud 40 provided with an internally threaded blind bore. Stud 40 is welded to the bottom of a recess 42 provided in tank bottom 22.

As shown in FIG. 2, stud 40 itself has a closed bottom via which it is welded to tank bottom 22, preferably by capacitive discharge welding, although other suitable fastening techniques can be employed.

An essential feature of the structure according to the present invention is that tank bottom 22 is completely closed, i.e., has no perforations therein, and in particular need not be perforated for attachment of stud 40.

A clamping bracket 44 in the form of a steel channel having a U-shaped configuration and provided, along the base of the channel, with an elongated slot 46, is attached to stud 40 by means of a bolt 48 extending through slot 46 and having an associated spring washer 50.

Clamping bracket 44 is given a length such that it extends completely across recess 42 and rests with one end against bottom 22 at a location spaced from the edge of recess 42. A region of clamping bracket 44 adjacent its other end bears against flange 16 so that when bolt 48 is tightened, bracket 44 clamps flange 16 against a portion of bottom 22 which is also spaced from the edge of recess 42, with leg 34 of baffle 30, in turn, clamped between bottom 22 and flange 16.

Because bracket 44 is provided with elongated slot 46 and is fastened to stud 40 by means of a bolt 48, the position of bracket 44 can be adjusted over a wide range so that a large tolerance exists with respect to the location of recess 42 and the positioning of stud 40 therein.

According to a particular feature of the invention, stud 40 can easily be given a vertical dimension which is not greater than the vertical depth of recess 42 so that the lower extremity of stud 40 will not extend beyond the plane of the flat portions of the lower surface of bottom 22. As a result of this arrangement, studs 40 will not interfere in any way with conveyance of tank 4, for example on a conveyer belt, during fabrication and before and after coating.

A final stage in the fabrication of tank 4 is the application of an electrostatic paint coating to all of its surfaces. During this operation, tank 4 can be held in an inverted position by threaded members engaging the threads in the bores of studs 40. The presence of these threaded members will prevent any significant amount of coating material from reaching the threaded portions in the blind bores, so that such coating material need not be subsequently removed preparatory to assembly of a tank 4 to a base 2.

Moreover, the closed bottom of each stud 40 prevents moisture from reaching tank bottom 22 via the interior of a stud 40, which is uncoated, and thereby further protects tank 22 against corrosion.

Figure 3:
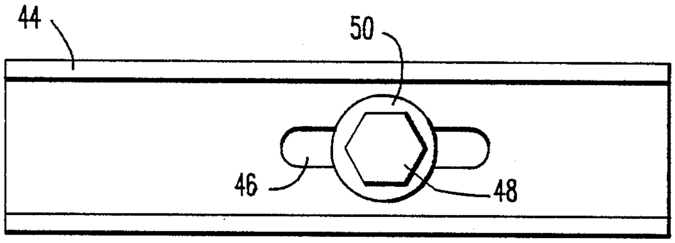
FIG. 3 is a plan view of the clamping element of the assembly shown in FIG. 2.

The relation between slot 46, bolt 48 and washer 50 is further depicted in the plan view of FIG. 3. It can be seen that since the exact point of contact of one end of bracket 44 with tank bottom 22 or the region at the other end of bracket 44 with flange 16 are not in any way critical, it is advantageous to make slot 46 relatively long in order to provide great latitude in the positioning of bracket 44.

While the illustrated embodiment includes an internally threaded stud 40 and externally threaded bolt 48, it will be appreciated that stud 40 could be a solid body having an external thread and bolt 48 could be a hollow cylinder having an internal thread.

While the description above shows particular embodiments of the present invention, it will be understood that many modifications may be made without departing from the spirit thereof. The pending claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a transformer housing assembly including a tank and a base supporting the tank, and a plurality of fastening devices securing the tank and based together, the tank being arranged to contain a body of oil and a transformer, and the tank having a bottom whose lower surface delimits a plane, and the base having an open top provided with an inwardly directed peripheral flange which supports the tank, the improvement wherein said tank bottom is formed to have a plurality of nonperforated upwardly recessed regions, each region having an outer edge located at said bottom plane and an interior portion located at a selected height above said bottom plane, and each said fastening device comprises: an attachment member permanently fastened to said tank bottom at said interior portion of a respective recessed region, said attachment member having a height not greater than said selected height and being provided with a screw thread; an elongate clamping member extending across said respective recessed region and having two opposed ends one of which bears against said tank bottom and the other of which ends bears against said base flange, said clamping member being provided with an elongate opening between said ends; and bolting means having a thread mating with said thread on said attachment member, said bolting means extending through said opening and engaging in said threaded bore for urging said other end of said clamping member against said flange in order to clamp said tank and base together.

2. An assembly as defined in claim 1 wherein said attachment member of each said fastening device has a downwardly opening bore which is internally threaded with said screw thread and said bolting means of each said fastening device is externally threaded.

3. An assembly as defined in claim 2 wherein said attachment member of each said fastening device has a closed attachment end located at one end of said bore and via which said attachment member is fastened to said tank bottom.

4. An assembly as defined in claim 3 wherein said attachment member of each said fastening device is welded to said tank bottom via said attachment end.

5. An assembly as defined in claim 1 wherein said attachment member is welded to said tank bottom.

6. An assembly as defined in claim 1 wherein said one end of said clamping member of each said fastening device bears against said tank bottom at a location spaced from said respective recessed region.

7. An assembly as defined in claim 1 wherein said clamping member of each said fastening device is in the form of a U-shaped channel.

8. An assembly as defined in claim 1 wherein said fastening devices are spaced apart around the periphery of said tank bottom.

9. An assembly as defined in claim 1 wherein said tank and said base each have a generally vertically extending front, wall and further comprising an elongate baffle member having a T-shaped cross section composed of a cross-piece having two opposed, longitudinally extending side edges, and a leg secured to said cross piece along a line parallel to and between said side edges, said leg extending transversely to said cross piece, wherein said leg is clamped between said tank bottom and said base so that a first portion of said cross piece located to one side of said leg is disposed adjacent said tank front wall, and a second portion of said cross piece located to the other side of said leg is disposed adjacent said base front wall.

* * * * *